United States Patent [19]

Wilcox

[11] 4,153,657
[45] May 8, 1979

[54] METHOD FOR MAKING A VEHICLE WHEEL WITH A FOAMED RESIN CORE

[76] Inventor: Raymond J. Wilcox, 44 Via Casitas, San Luis Rey Downs, Calif. 92068

[21] Appl. No.: 847,334

[22] Filed: Oct. 31, 1977

Related U.S. Application Data

[60] Continuation of Ser. No. 665,608, Mar. 10, 1976, abandoned, which is a division of Ser. No. 527,555, Nov. 27, 1974, Pat. No. 3,968,996.

[51] Int. Cl.² ............................................. B29D 27/04
[52] U.S. Cl. .................................. 264/46.6; 156/228; 156/330; 264/46.7; 264/46.9; 264/267; 264/DIG. 83
[58] Field of Search ..................... 264/46.5, 46.6, 46.9, 264/46.7, DIG. 83, 267; 301/37 R, 37 P, 63 DD, 63 PW, 63 R; 156/228, 330

[56] References Cited

U.S. PATENT DOCUMENTS

| | | | |
|---|---|---|---|
| 2,547,953 | 4/1951 | Lyon | 301/37 P |
| 3,663,064 | 5/1972 | McCarroll | 301/37 P X |
| 3,669,501 | 6/1972 | Derleth | 264/46.5 X |
| 3,790,219 | 2/1974 | Watts | 301/63 DD |
| 3,810,337 | 5/1974 | Pollard | 264/46.5 X |
| 3,909,065 | 9/1975 | Main | 301/63 R X |
| 3,917,779 | 11/1975 | Breer et al. | 264/46.5 |
| 3,968,996 | 7/1976 | Wilcox | 301/63 DD X |
| 4,000,926 | 1/1977 | Wilcox | 29/159.01 X |
| 4,017,348 | 4/1977 | Shumaker | 156/192 X |

FOREIGN PATENT DOCUMENTS 2423181  11/1975  Fed. Rep. of Germany ..... 301/63 PW

*Primary Examiner*—Philip Anderson
*Attorney, Agent, or Firm*—Reising, Ethington, Barnard, Perry & Brooks

[57] ABSTRACT

Polyurethane foam is used in a three-piece vehicle wheel as a load bearing and load transmitting structural element. The rim of the wheel, an inner wheel disc, and an outer decorative wheel disc are bonded together by the polyurethane foam. The rim includes an interlock lip to interlock the rim with the inner disc and an interlock lip that interlocks the rim with the outer decorative disc. The wheel can be manufactured by placing the rim, inner disc, and outer disc in a die and injecting the polyurethane foam composition into the interconnected volume enclosed and defined by those wheel components. The foam curing process then occurs in situ. Alternatively, the rim, inner disc, and outer disc can be adhesively bonded to a preformed polyurethane foam member. The resultant vehicle wheel, manufactured by either process, is characterized by high strength, light weight, and a decorative appearance.

6 Claims, 4 Drawing Figures

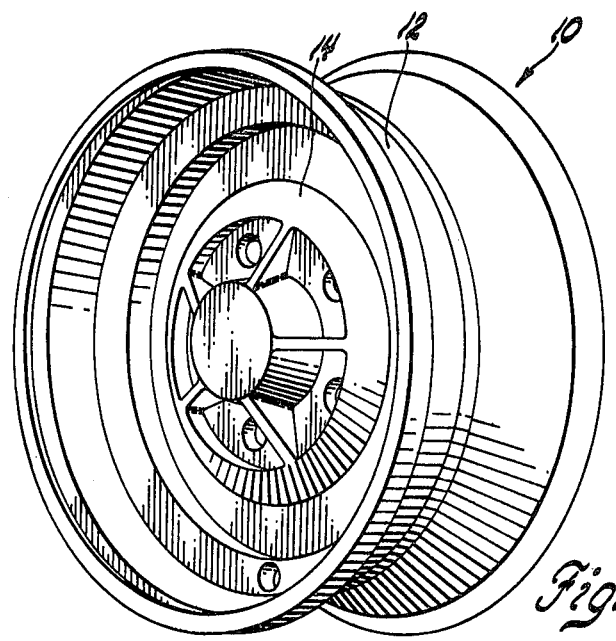
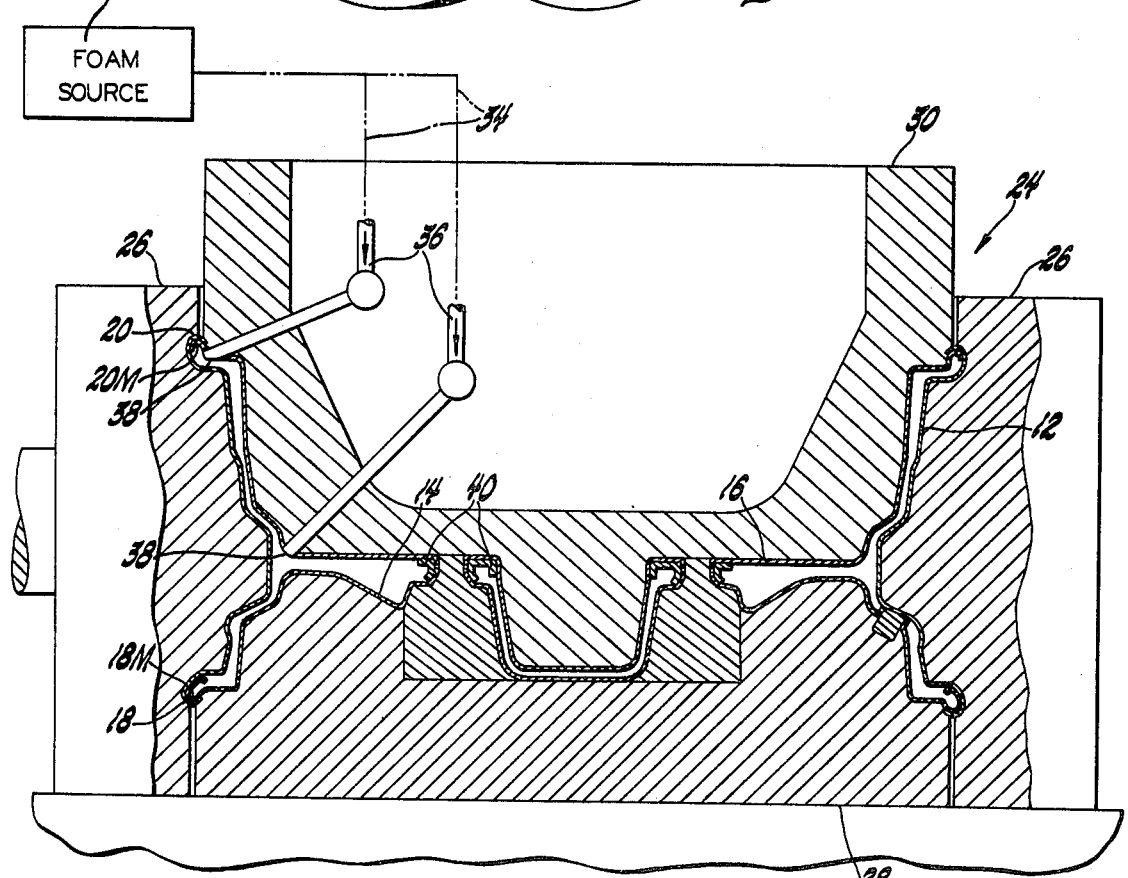

METHOD FOR MAKING A VEHICLE WHEEL WITH A FOAMED RESIN CORE

This is a continuation, of application Ser. No. 665,608, filed Mar. 10, 1976 now abandoned as a division of application Ser. No. 527,555, filed on Nov. 27, 1974 and issued on July 13, 1976 as U.S. Pat. No. 3,968,996.

BACKGROUND OF THE INVENTION

1. Field of the Invention

This invention relates to a vehicle wheel.

2. Description of the Prior Art

The design concepts and production techniques used in the manufacture of vehicle wheels for the automotive industry have not been significantly changed for many years. The only notable exception was the introduction of styled wheels in the 1960's. Styled wheels do not require hubcaps or other wheel covers, and their popularity has grown continuously since their introduction. Nonetheless, the conventional steel disc wheel still predominates.

Vehicle wheels have been fabricated from synthetic plastic materials. U.S. Pat. No. 3,790,220 illustrates and describes such a plastic wheel. As noted in that patent, these wheels have not been competitive with steel wheels. Rather plastic wheels have been especially, though not exclusively, intended for use with vehicles such as transport carts, fork lifts, and the like, having small diameter wheels.

Plastic materials are also known for use as elements in otherwise metal wheels. For example, U.S. Pat. No. 3,790,219 discloses the use of expanded polyurethane or polystyrene foam, or any other honeycomb plastic material, for use as a spacer, or packing element, in wrought metal wheels. The wheels which are the subject of U.S. Pat. No. 3,790,219 are wheels manufactured from light-weight alloys such as alloys of magnesium for high performance cars.

Polyurethane foam is also known for use as an adhesive to bond ornamental plastic wheel covers to conventional steel disc wheels. U.S. Pat. No. 3,669,501 shows such an application for polyurethane foam. As pointed out in that patent, the wheel is of conventional construction, i.e., the wheel is the conventional steel disc wheel which predominates the vehicle wheel market. The polyurethane is strictly an adhesive material to secure the cover permanently to the wheel.

SUMMARY OF THE INVENTION

In contrast with the prior art, the vehicle wheel manufactured by the present invention uses an organic resin foam, such as polyurethane foam, as a structural load bearing member. An inner wheel disc, an outer decorative disc, and a rim interlocked with both those discs are interconnected and bonded by polyurethane foam. The polyurethane foam serves as a load bearing and load transmitting structural member. According to one method for manufacturing the instant wheel, the wheel rim, inner wheel disc, and outer decorative disc are positioned in a die, and a polyurethane composition is then injected into the volume defined by those wheel components for curing in situ. Alternatively, a polyurethane foam preform is adhesively bonded to the rim, inner wheel disc, and outer decorative disc in an assembly die.

The vehicle wheel manufactured by the present invention provides style flexibility and styling attractiveness. Furthermore, the instant wheel affords improved dimensional control, improved concentricity, and improved wheel balance in a vehicle wheel further characterized by low cost and light weight. Finally, since the resultant wheel is a solid wheel, noise control is insured.

BRIEF DESCRIPTION OF THE DRAWINGS

The instant invention can be best understood by reference to the following description of a preferred embodiment taken in connection with the accompanying drawings in which:

FIG. 1 is a perspective view of a vehicle wheel manufactured in accordance with the instant invention;

FIG. 2 is a sectional view of a fabrication die for retaining the vehicle wheel of FIG. 1 as it is foamed and cured in situ;

DESCRIPTION OF THE PREFERRED EMBODIMENT

Reference should now be made to the drawings, and more particularly to FIG. 1, wherein a vehicle wheel 10 is illustrated. The vehicle wheel 10 includes a rim 12 and a styled front or outer disc 14. The wheel 10 also includes an inner disc 16 illustrated in FIGS. 2 and 3, but not visible in the perspective view of FIG. 1.

Figure 3:
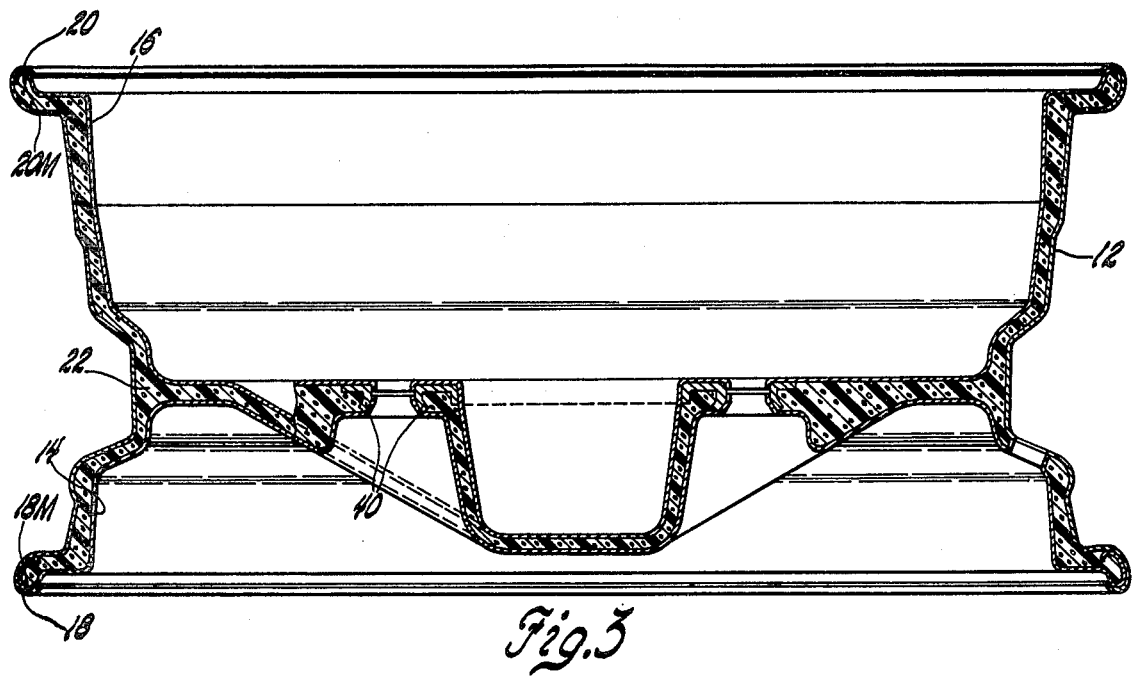
FIG. 3 is a cross-section of the vehicle wheel of FIG. 1.
Figure 4:
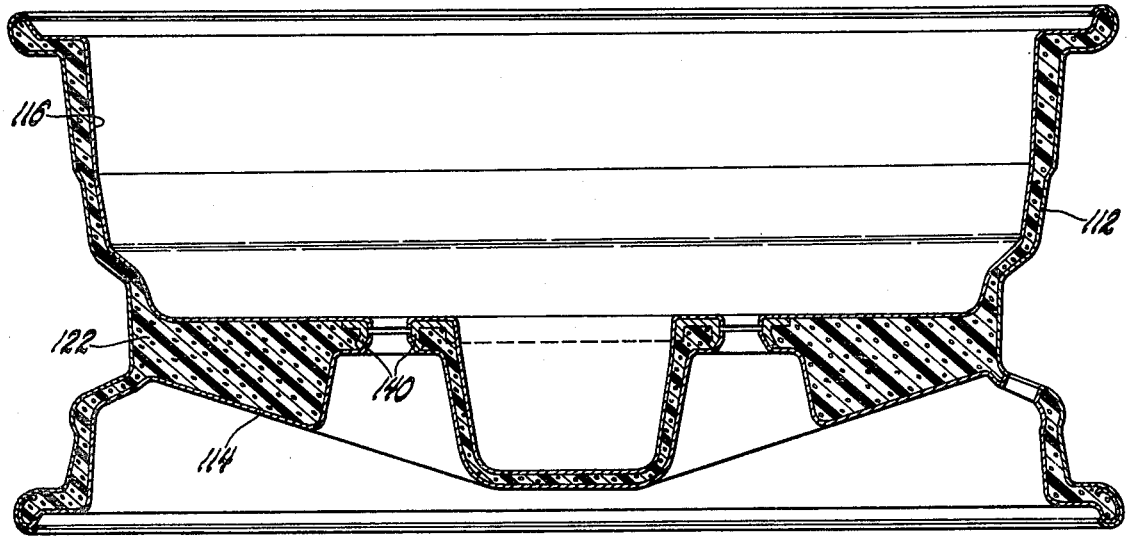
FIG. 4 is a cross-section of an alternative design of the vehicle wheel of the instant invention.

The rim 12 has spaced interlock lips 18 and 20 which interlock respectively with the outer disc 14 and the inner disc 16. As shown in FIGS. 2 and 3, the interlock lips 18 and 20 comprise the side edges of the rim 12 curved to form retaining grooves for the corresponding mating curved portions 18M and 20M of the outer and inner discs. The assembly of the rim 12, the outer disc 14, and the inner disc 16 is bonded together by an organic resin structural foam member 22 comprising, for example, polyurethane foam. The polyurethane foam member 22 fills the volume enclosed and defined by the rim 12, the outer disc 14, and the inner disc 16. The polyurethane foam member 22 is disposed as a load bearing and load transmitting element of the wheel. This aspect of the preferred embodiment is best shown in FIGS. 3 and 4.

In its preferred form, the wheel of the instant invention is fabricated with an outer skin entirely of steel. The outer disc 14 is made from stainless steel, and the rim 12 and inner disc 16 are made from cold rolled steel. Stainless steel stock 0.015 inches thick is suitable for the outer disc, and the disc can be given a high luster finish. The other wheel components, fabricated from cold rolled steel, are also made from stock 0.015 inches thick.

FIG. 2 depicts a fabrication die 24 including a plurality of rim retaining and support sections 26, a retaining and support section 28 for engagement with the outer disc 14, and a retaining and support section 30 for engagement with the inner disc 16. The die sections 26 are radially split, like pie wedges, to permit radial withdrawal and separation of those sections. The die sections 28 and 30 can be axially separated to permit loading and unloading of wheel components and finished wheels.

At the start of each cycle, a partially preformed rim is placed on the several die wedges 26 in their withdrawn positions. The outer disc 14 is placed on the die sections 28, and the inner disc 16 is placed on the die section 30.

The die 24 is then activated to position the wheel components. As the die wedges 26 are advanced radially inward, they form the rim 12 to its final configuration in which the two circumferential ends of the rim 12 overlap. The interlock lips 18 and 20 envelop the corresponding mating portions 18M and 20M of the inner and outer discs as the die wedges 26 are advanced to their final positions.

After the rim 12, the outer disc 14, and the inner disc 16 are positioned by the die, an organic resin composition, polyurethane in the illustrated embodiment, is introduced into the cavity defined and enclosed by those wheel components. A foam source 32 supplies the composition through connectors 34 and into the wheel cavity through passages 36 in the die and inlet ports 38 in the wheel elements. In the illustrated embodiment, the inlet ports 38 are located in the inner disc 16. The organic resin composition is introduced into the wheel cavity as a liquid, and the foaming and curing process occurs thereafter. The pressures of the foaming process can be used to final form the wheel components.

To increase adhesiveness, the rim 12, the outer disc 14, and the inner disc 16 can be coated on the appropriate surfaces with organic resin. Alternatively, a roughened texture can be provided to improve bonding of the foam to the wheel components.

As an alternative to the fabrication technique described above in connection with FIG. 2, the wheel of the present invention can be assembled using a foam preform. Following such a procedure, an adhesive, such as epoxy, is applied to the metal wheel components, and the foam preform would be positioned in the die 24 prior to closing the die sections to form the wheel.

For either fabrication process, after the wheel is assembled, the die sections are separated, and the finished wheel is removed.

In the illustrated embodiment a steel insert 40 reinforces the wheel when the wheel is mounted on a vehicle. The insert 40 serves as a load bearing element of the wheel which carries and distributes the wheel load. As illustrated in the drawings, the insert 40 is an annulus or collar encircling the center of the wheel and provided with apertures or holes for the mounting lugs used to mount the hweel on the vehicle.

The finished wheel is illustrated in cross-section in FIG. 3. The foam member 22 of the finished wheel is a structural member both supporting and transmitting load forces. Load forces are transmitted between the axle or wheel attachment point and the load surface through the foam 22 and the rim 12.

FIGS. 3 and 4 include the same wheel components. FIG. 4 includes a rim 112, an outer disc 114, and an inner disc 116, interconnected and bonded by a load bearing and load transmitting organic resin foam member 122. The embodiment of FIG. 4 also includes a steel insert 140, which is equivalent to the insert 40, to carry and distribute the wheel load. The difference between the two wheels resides in the design of the outer discs 14 and 114. This difference illustrates the flexibility available in the design of wheels made according to the present invention.

Although the foregoing has proceeding in terms of a particular illustrated embodiment, it is to be understood that various changes and modifications could be engrafted thereon by one skilled in the art within the spirit and scope of the appended claims.

The embodiments of the invention in which an exclusive property or privilege is claimed are defined as follows:

1. A method for making a vehicle wheel comprising: positioning a plurality of structural members to form an outer skin that defines a cavity having an annular rim portion and an interconnected disc portion with the cavity rim portion projecting from the cavity disc portion to opposite axial sides of the wheel, and injecting a foamable organic resin composition into the cavity for foaming and curing in situ so as to fill both the rim and disc portions of the cavity and to bond to the structural members within the cavity to thereby provide a load bearing and transmitting element.

2. A method as in claim 1 wherein an annular metallic rim, an inner metallic disc, and an outer metallic disc are positioned with respect to each other to provide the skin defining the cavity.

3. A method as in claim 1 wherein an adhesive is applied to the structural members before the foam is injected into the cavity so as to enhance bonding of the cured foam to the members.

4. A method as in claim 1 wherein an annular steel rim, an inner steel disc, and an outer steel disc are interlocked with each other to provide the skin defining the cavity, and wherein an adhesive is applied to the discs and rim before the foam injection into the cavity so as to enhance bonding of the cured foam to the discs and the rim.

5. A method for making a vehicle wheel comprising: positioning inner and outer steel discs and an annular steel rim to provide an outer skin that defines a cavity having an annular rim portion and an interconnected disc portion with the cavity rim portion projecting from the cavity disc portion to opposite axial sides of the wheel, and injecting a foamable organic resin composition into the cavity for foaming and curing in situ so as to fill both the rim and disc portions of the cavity and to bond to the rim and discs to thereby provide a load bearing and transmitting element.

6. A method for making a vehicle wheel comprising: applying an adhesive to an annular steel rim and to inner and outer steel discs, interlocking the rim with the discs to provide an outer skin that defines a cavity having an annular rim portion and an interconnected disc portion with the cavity rim portion projecting from the cavity disc portion to opposite axial sides of the wheel, and injecting a foamable organic resin composition into the cavity for foaming and curing in situ so as to fill both the rim and disc portions of the cavity and so as to bond to the rim and discs with the adhesive enhancing the bonding whereby the foam provides a load bearing and transmitting element within the skin.

* * * * *